United States Patent
Yang et al.

(10) Patent No.: US 9,803,070 B2
(45) Date of Patent: Oct. 31, 2017

(54) CARBOXYLIC ACID MODIFIED-NITRILE BASED COPOLYMER LATEX FOR DIP-FORMING, LATEX COMPOSITION FOR DIP-FORMING COMPRISING THE SAME, AND PRODUCT THEREOF

(71) Applicant: LG CHEM, LTD., Seoul (KR)

(72) Inventors: Seung Hun Yang, Daejeon (KR); Jung Su Han, Daejeon (KR); Seung Uk Yeu, Daejeon (KR); Byoung Yun Kim, Daejeon (KR); Jung Eun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 867 days.

(21) Appl. No.: 14/353,016

(22) PCT Filed: Nov. 13, 2012

(86) PCT No.: PCT/KR2012/009540
§ 371 (c)(1),
(2) Date: Apr. 18, 2014

(87) PCT Pub. No.: WO2013/077585
PCT Pub. Date: May 30, 2013

(65) Prior Publication Data
US 2014/0302265 A1 Oct. 9, 2014

(30) Foreign Application Priority Data
Nov. 22, 2011 (KR) ........................ 10-2011-0122144

(51) Int. Cl.
| | |
|---|---|
| C08L 9/04 | (2006.01) |
| B29C 41/00 | (2006.01) |
| B29C 41/14 | (2006.01) |
| C08F 212/10 | (2006.01) |
| C08F 236/06 | (2006.01) |
| C08L 55/02 | (2006.01) |

(52) U.S. Cl.
CPC .............. *C08L 9/04* (2013.01); *B29C 41/003* (2013.01); *B29C 41/14* (2013.01); *C08F 212/10* (2013.01); *C08F 236/06* (2013.01); *C08L 55/02* (2013.01); *Y10T 428/1386* (2015.01); *Y10T 428/2982* (2015.01)

(58) Field of Classification Search
CPC .......... C08L 9/04; C08L 55/02; B29C 41/003; B29C 41/14; C08F 212/10; C08F 236/06; Y10T 428/1386; Y10T 428/2982
USPC ........................................................ 428/36.8
See application file for complete search history.

(56) References Cited

U.S. PATENT DOCUMENTS 5,084,514 A 1/1992 Szczechura et al.

FOREIGN PATENT DOCUMENTS

| CN | 102159604 A | 8/2011 | |
|---|---|---|---|
| CN | 102224177 A | 10/2011 | |
| EP | 0 524 836 A1 | 1/1993 | |
| EP | 0524836 A1 * | 1/1993 | ........... A61L 31/049 |
| JP | 09-505612 A | 6/1997 | |
| JP | 2001-123015 A | 5/2001 | |
| JP | 2008-512526 A | 4/2008 | |
| JP | 2010-59230 A | 3/2010 | |
| KR | 10-2011-0038992 A | 4/2011 | |
| KR | 10-2011-0052222 A | 5/2011 | |
| KR | 10-2011-0088795 A | 8/2011 | |
| WO | 2010035955 A2 | 4/2010 | |
| WO | 2010060863 A1 | 6/2010 | |

* cited by examiner

*Primary Examiner* — Ling Choi
*Assistant Examiner* — Ronald Grinsted
(74) *Attorney, Agent, or Firm* — Dentons US LLP

(57) ABSTRACT

Disclosed are a carboxylic acid-modified nitrile copolymer latex for dip molding comprising a combination of a carboxylic acid-modified nitrile copolymer latex and a carboxylic acid-modified styrene copolymer latex, a latex composition for dip molding comprising the same and a molded article prepared therefrom. Molded articles with superior tensile strength are produced by respectively preparing a carboxylic acid-modified nitrile latex having a low glass transition temperature and an average particle diameter of 90 nm or higher, and a carboxylic acid-modified styrene latex having a glass transition temperature of 80° C. or higher and an average particle diameter less than 90 nm and then mixing the two latexes.

16 Claims, No Drawings

CARBOXYLIC ACID MODIFIED-NITRILE BASED COPOLYMER LATEX FOR DIP-FORMING, LATEX COMPOSITION FOR DIP-FORMING COMPRISING THE SAME, AND PRODUCT THEREOF

This application is a National Stage entry of International Application No. PCT/KR2012/009540, filed on Nov. 13, 2012, which claims priority to Korean Patent Application No. 10-2011-0122144, filed on Nov. 22, 2011, with the Korean Intellectual Property Office, all of which are incorporated herein in their entirety by reference.

TECHNICAL FIELD

The present invention relates to a carboxylic acid-modified nitrile copolymer latex for dip molding, a latex composition for dip molding comprising the same and a molded article prepared therefrom. More specifically, the present invention relates to a carboxylic acid-modified nitrile copolymer latex for dip molding which is obtained by respectively preparing a carboxylic acid-modified nitrile copolymer latex having a glass transition temperature of −50° C. to −15° C. and an average particle diameter of 90 nm or higher, and a carboxylic acid-modified styrene copolymer latex having a glass transition temperature of 80° C. or higher and an average particle diameter less than 90 nm, followed by mixing the two latexes, and thus enables production of molded articles with superior tensile strength, a latex composition for dip molding comprising the same and a molded article prepared therefrom.

BACKGROUND ART

In recent years, glove manufacturers continuously make a great deal of effect to reduce weight of nitrile rubber gloves. Gloves should be thinly produced in order to reduce weight thereof. The thin gloves may have a problem of deterioration in tensile strength thereof.

DISCLOSURE

Technical Problem

Accordingly, glove manufacturers are greatly interested in carboxylic acid-modified nitrile latexes that do not deteriorate tensile strength in spite of small thickness. However, carboxylic acid-modified latexes which exhibit superior tensile strength when used for lightweight gloves are not developed to date.

Technical Solution

Therefore, the present invention has been made in view of the above problems, and it is one object of the present invention to provide a carboxylic acid-modified nitrile copolymer latex which enables production of molded articles having higher tensile strength and better wearing sensation than conventional gloves.

It is another object of the present invention to provide a latex composition for dip molding comprising the carboxylic acid-modified nitrile copolymer latex and a molded article prepared therefrom.

The objects of the present invention can be accomplished by the present invention described below.

The present invention solves the problem of conventional gloves by mixing 85 to 97% by weight of a carboxylic acid-modified nitrile copolymer latex having a glass transition temperature of −50° C. to −15° C. and an average particle diameter of 90 nm or higher, with 3 to 15% by weight of a carboxylic acid-modified styrene copolymer latex having a glass transition temperature of 80° C. or higher and an average particle diameter less than 90 nm to prepare a latex and incorporating the latex into a latex composition for dip molding.

BEST MODE

The carboxylic acid-modified nitrile copolymer latex according to the present invention to accomplish the objects described above comprises a carboxylic acid-modified nitrile copolymer latex having a glass transition temperature of −50° C. to −15° C., and an average particle diameter not less than 90 nm and not more than 200 nm and a carboxylic acid-modified styrene copolymer latex having a glass transition temperature of 80° C. or higher and an average particle diameter not less than 15 nm and less than 90 nm.

In a preferred embodiment, the carboxylic acid-modified nitrile copolymer latex for dip molding is prepared by mixing 85 to 97% by weight of a carboxylic acid-modified nitrile copolymer latex (hereinafter, referred to as "latex A") having a glass transition temperature of −50° C. to −15° C. and an average particle diameter not less than 90 nm and not more than 200 nm with 3 to 15% by weight of a carboxylic acid-modified styrene copolymer latex (hereinafter, referred to as "latex B") having a glass transition temperature of 80° C. to 105° C. and an average particle diameter not less than 15 nm and less than 90 nm.

When the glass transition temperature of the latex A is lower than −50° C., tensile strength is considerably deteriorated, and when the glass transition temperature is higher than −15° C., dip-molded articles are disadvantageously cracked. In addition, when the average particle diameter is less than 90 nm, disadvantageously, viscosity of the latex is increased and dip-molded articles become transparent.

When the average particle diameter of the latex A exceeds 200 nm, disadvantageously, production efficiency is deteriorated due to long latex preparation time and tensile strength is deteriorated after production of dip-molded articles.

When the glass transition temperature of the latex B is lower than 80° C., improvement in tensile strength of dip-molded articles is deteriorated. In addition, although the average particle diameter is not less than 90 nm, improvement in tensile strength of dip-molded articles is deteriorated and dip-molded articles are readily cracked.

When the average particle diameter of the latex B is less than 15 nm, it is difficult to prepare the latex by emulsion polymerization and tensile strength and elongation of dip-molded articles are deteriorated due to use of great amounts of emulsifier for the preparation.

The latex composition for dip molding may comprise the latex A and the latex B at a ratio of 97:3 to 85:15.

When the latexes A and B are present in amounts out of the range, that is, the latex A is present in an amount exceeding 97% and the latex B is present in an amount of less than 3%, improvement in tensile strength is insufficient. When the latex A is present in an amount less than 85% and the latex B is present in an amount exceeding 15%, both elongation and tensile strength are disadvantageously deteriorated.

In addition, a latex composition for dip molding comprising the carboxylic acid-modified nitrile copolymer latex comprises, in addition to the carboxylic acid-modified nitrile copolymer, at least one additive selected from the group consisting of a vulcanizing agent, an ionic crosslinking agent, a pigment, a filler, a thickener and a pH controller.

In another aspect of the present invention, provided is a dip-molded article obtained by dip-molding the composition.

Hereinafter, the present invention will be described in more detail.

A final product of the present invention is prepared by adding an emulsifier, a polymerization initiator, a molecular weight controller and the like to respective monomers constituting the latex A to prepare the latex A, adding an emulsifier, adding a polymerization initiator, a molecular weight controller and the like to respective monomers constituting the latex B to prepare the latex B, mixing the latex A with the latex B to prepare a carboxylic acid nitrile latex, incorporating the carboxylic acid nitrile latex into a latex composition for dip molding and dip-molding the resulting composition to produce a final article.

Hereinafter, the latex A, the latex B, the mixed carboxylic acid-modified nitrile copolymer latex and the latex composition comprising the mixed latex used to obtain the dip-molded article of the present invention will be described in more detail.

1. Latex A

The latex A according to the present invention is prepared by adding an emulsifier, a polymerization initiator, a molecular weight controller and other additives to respective monomers constituting the carboxylic acid-modified nitrile copolymer, followed by emulsion polymerization.

The monomers constituting the carboxylic acid-modified nitrile copolymer include a conjugated diene monomer, an ethylenically unsaturated nitrile monomer, an ethylenically unsaturated acid monomer and a copolymerizable ethylenically unsaturated monomer.

Specifically, the conjugated diene monomer as another monomer constituting the carboxylic acid-modified nitrile copolymer according to the present invention is selected from the group consisting of 1,3-butadiene, 2,3-dimethyl-1,3-butadiene, 2-ethyl-1,3-butadiene, 1,3-pentadiene, isoprene and mixtures thereof. 1,3-butadiene and isoprene are preferred and, in particular, 1,3-butadiene is most preferred.

The conjugated diene monomer is present in an amount of 40 to 89% by weight, specifically 45 to 80% by weight, most specifically 50 to 78% by weight based on the total weight of the monomers constituting the carboxylic acid-modified nitrile copolymer. When the content of the conjugated diene monomer is less than 40% by weight, dip-molded article becomes hard and wearing sensation is deteriorated, and when the content exceeds 90% by weight, oil resistance of the dip-molded article becomes bad and tensile strength thereof is deteriorated.

The ethylenically unsaturated nitrile monomer as another monomer constituting the carboxylic acid-modified nitrile copolymer according to the present invention is selected from the group consisting of acrylonitrile, methacrylonitrile, fumaronitrile, α-chloronitrile, α-cyanoethylacrylonitrile and mixtures thereof. Of these, acrylonitrile and methacrylonitrile are preferred and acrylonitrile is most preferred.

The ethylenically unsaturated nitrile monomer is present in an amount of 10 to 50% by weight, specifically 15 to 45% by weight, most specifically 20 to 40% by weight, based on the total weight of the monomers constituting the carboxylic acid-modified nitrile copolymer. When the content of the ethylenically unsaturated nitrile monomer is less than 10% by weight, oil resistance of the dip-molded article becomes bad and tensile strength thereof is deteriorated, and when the content exceeds 50% by weight, the dip-molded article becomes hard and wearing sensation is deteriorated.

The ethylenically unsaturated acid monomer, as another monomer constituting the carboxylic acid-modified nitrile copolymer according to the present invention, has at least one acid group selected from the group consisting of carboxyl, sulfonic acid and acid anhydride groups. Examples of the ethylenically unsaturated acid monomer include: ethylenically unsaturated carboxylic acid monomers, such as acrylic acid, methacrylic acid, itaconic acid, maleic acid and fumaric acid; polycarboxylic acid anhydrides, such as maleic anhydride and citraconic anhydride; ethylenically unsaturated sulfonic acid monomers, such as styrenesulfonic acid; and partial ester monomers of ethylenically unsaturated polycarboxylic acids, such as monobutyl fumarate, monobutyl maleate and mono-2-hydroxypropyl maleate. Methacrylic acid is particularly preferred. The ethylenically unsaturated acid monomer may be used in the form of an alkali metal salt or an ammonium salt.

The ethylenically unsaturated acid monomer is present in an amount of 0.1 to 10% by weight, specifically 0.5 to 9% by weight, more specifically 1 to 8% by weight, based on the total weight of the monomers constituting the carboxylic acid-modified nitrile copolymer. When the content of the ethylenically unsaturated acid monomer is lower than 0.1% by weight, tensile strength of the dip-molded article is deteriorated and when the content exceeds 10% by weight, the dip-molded article becomes hard and wearing sensation is deteriorated.

The carboxylic acid-modified nitrile copolymer according to the present invention may optionally further comprise an ethylenically unsaturated monomer copolymerizable with the ethylenically unsaturated nitrile monomer and the ethylenically unsaturated acid monomer. Specifically, the copolymerizable ethylenically unsaturated monomer is selected from the group consisting of: vinyl aromatic monomers, such as styrene, alkylstyrene and vinyl naphthalene; fluoroalkyl vinyl ethers, such as fluoroethyl vinyl ether; ethylenically unsaturated amide monomers, such as (meth)acrylamide, N-methylol(meth)acrylamide, N,N-dimethylol(meth)acrylamide, N-methoxymethyl(meth)acrylamide and N-propoxymethyl(meth)acrylamide; non-conjugated diene monomers, such as vinyl pyridine, vinyl norbornene, dicyclopentadiene and 1,4-hexadiene; ethylenically unsaturated carboxylic acid ester monomers, such as methyl (meth)acrylate, ethyl (meth)acrylate, butyl (meth)acrylate, 2-ethylhexyl(meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl(meth)acrylate, 1-cyanopropyl (meth)acrylate, 2-ethyl-6-cyanohexyl(meth)acrylate, 3-cyanopropyl(meth)acrylate, hydroxyethyl (meth)acrylate, hydroxypropyl (meth)acrylate, glycidyl (meth)acrylate and dimethylaminoethyl (meth)acrylate; and mixtures thereof.

The ethylenically unsaturated monomer copolymerizable with the ethylenically unsaturated nitrile monomer and the ethylenically unsaturated acid monomer is used in an amount of 20% by weight or less, based on the total weight of the monomers constituting the carboxylic acid-modified nitrile copolymer. When the content exceeds 20% by weight, imbalance between soft wearing sensation and tensile strength is caused.

The carboxylic acid-modified nitrile copolymer latex may be prepared by adding an emulsifier, a polymerization initiator, a molecular weight controller and the like to the monomers constituting the carboxylic acid-modified nitrile copolymer, followed by emulsion polymerization.

Examples of the emulsifier include, but are not particularly limited to, anionic surfactants, nonionic surfactants, cationic surfactants and amphoteric surfactants. The surfactant is particularly preferably an anionic surfactant selected from the group consisting of alkylbenzene sulfonate, aliphatic sulfonate, sulfate ester of higher alcohol, α-olefin sulfonate and alkyl ether sulfate ester. The emulsifier is preferably used in an amount of 0.3 to 10 parts by weight, more specifically 0.8 to 8 parts by weight, and most specifically 1.5 to 6 parts by weight, based on 100 parts by weight of the monomers constituting the carboxylic acid-modified nitrile copolymer.

When the emulsifier is used in an amount of less than 0.3 parts by weight, polymerization stability is deteriorated, and when the emulsifier is used in an amount exceeding 10 parts by weight, formation of increased bubbles makes production of dip-molded article difficult.

The kind of the polymerization initiator is not particularly limited. The polymerization initiator is preferably a radical initiator. The radical initiator is selected from the group consisting of: inorganic peroxides, such as sodium persulfate, potassium persulfate, ammonium persulfate, potassium perphosphate and hydrogen peroxide; organic peroxides, such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide and t-butylperoxy isobutyrate;

azobisisobutyronitrile; azobis-2,4-dimethylvaleronitrile; azobiscyclohexane carbonitrile; methyl azobisisobutyrate; and mixtures thereof. Inorganic peroxides are more preferred. The polymerization initiator is specifically used in an amount of 0.01 to 2 parts by weight, more specifically 0.02 to 1.5 parts by weight, based on 100 parts by weight in total of the monomers constituting the carboxylic acid-modified nitrile copolymer.

When the amount of polymerization initiator used is less than 0.01 parts by weight, it is difficult to produce final products due to low polymerization speed, and when the amount thereof exceeds 2 parts by weight, it is impossible to control polymerization due to excessively high polymerization speed.

An activator is selected from the group consisting of sodium formaldehyde sulfoxylate, sodium ethylenediaminetetraacetate, ferrous sulfate, dextrose, sodium pyrophosphate, sodium sulfite and mixtures thereof.

Examples of the molecular weight modifier include, but are not particularly limited to: α-methylstyrene dimers; mercaptans, such as t-dodecyl mercaptan, n-dodecyl mercaptan and octyl mercaptan; halogenated hydrocarbons, such as carbon tetrachloride, methylene chloride and methylene bromide; and sulfur-containing compounds, such as tetraethylthiuram disulfide, dipentamethylenethiuram disulfide and diisopropylxanthogene disulfide. These molecular weight modifiers may be used alone or in combination of two or more thereof. Of these, mercaptans are preferred. T-dodecyl mercaptan is more preferred. The amount of the molecular weight modifier used may vary depending on the kind thereof. The amount of the molecular weight modifier used is specifically 0.1 to 2.0 parts by weight, more specifically 0.2 to 1.5 parts by weight, most specifically 0.3 to 1.0 parts by weight, with respect to 100 parts by weight of the total weight of the monomers constituting the carboxylic acid-modified nitrile copolymer.

When the amount of the molecular weight controller is less than 0.1 parts by weight, physical properties of a dip-molded article are significantly deteriorated and when the amount thereof exceeds 2 parts by weight, polymerization stability is disadvantageously deteriorated.

If necessary, one or more additives such as chelating agents, dispersants, pH-adjusting agents, oxygen absorbers, particle size modifiers, antioxidants, and oxygen scavengers can be added in the preparation of latex.

There is no particular restriction on how to add the mixture of the monomers constituting the carboxylic acid-modified nitrile copolymer. For example, the mixture of the monomers may be added to a polymerization reactor in one portion or in successive portions. Alternatively, after a portion of the monomer mixture is added to a polymerization reactor, the remainder is added successively to the polymerization reactor.

The emulsion polymerization is generally carried out at a temperature of 10 to 90° C., preferably 25 to 75° C. Polymerization is stopped when polymerization conversion reaches a predetermined level, preferably at least 90% and more preferably at least 93%. The carboxylic acid-modified nitrile copolymer latex may be obtained by removing unreacted monomers and adjusting solid content and pH to desired levels.

The glass transition temperature may be adjusted according to the content of the conjugated diene monomer and the average particle diameter may be adjusted according to type or content of the emulsifier.

The latex glass transition temperature is measured by differential scanning calorimetry and the average particle diameter is measured with a laser scattering analyzer (Nicomp).

2. Latex B

The latex B according to the present invention is prepared by adding an emulsifier, a polymerization initiator, a molecular weight controller and other additives to respective monomers constituting the carboxylic acid-modified styrene copolymer, followed by emulsion polymerization.

The monomers constituting the carboxylic acid-modified styrene copolymer comprise: an aromatic vinyl monomer; an ethylenically unsaturated nitrile monomer; an ethylenically unsaturated acid monomer; and a copolymerizable ethylenically unsaturated monomer.

The aromatic vinyl monomer as another monomer constituting the carboxylic acid-modified styrene copolymer according to the present invention is selected from the group consisting of styrene and α-methyl styrene. Styrene is most preferred.

The aromatic vinyl monomer is present in an amount of 80 to 99% by weight, specifically 82 to 98% by weight, most specifically 85 to 96% by weight, based on the total weight of the monomers constituting the carboxylic acid-modified styrene copolymer. When the content of the aromatic vinyl monomer is less than 80% by weight, tensile strength is deteriorated during dip molding, and when the content exceeds 99% by weight, polymerization stability is deteriorated.

The ethylenically unsaturated nitrile monomer as another monomer constituting the carboxylic acid-modified styrene copolymer is selected from the group consisting of acrylonitrile, methacrylonitrile, fumaronitrile, α-chloronitrile, α-cyanoethylacrylonitrile and mixtures thereof. Of these, acrylonitrile and methacrylonitrile are preferred and acrylonitrile is most preferred.

The ethylenically unsaturated nitrile monomer is present in an amount of 1 to 20% by weight, specifically 2 to 18% by weight, most specifically 4 to 15% by weight, based on the total weight of the monomers constituting the carboxylic acid-modified styrene copolymer. When the content of the ethylenically unsaturated nitrile monomer is less than 1% by weight, compatibility with the carboxylic acid-modified styrene copolymer is deteriorated, and when the content exceeds 20% by weight, polymerization stability is deteriorated.

The ethylenically unsaturated acid monomer as another monomer constituting the carboxylic acid-modified styrene copolymer has at least one acid group selected from the group consisting of carboxyl, sulfonic acid and acid anhydride groups. Examples of the ethylenically unsaturated acid monomer include, but are not limited to: ethylenically unsaturated carboxylic acid monomers, such as acrylic acid, methacrylic acid, itaconic acid, maleic acid and fumaric acid; polycarboxylic acid anhydrides, such as maleic anhydride and citraconic anhydride; ethylenically unsaturated sulfonic acid monomers, such as styrenesulfonic acid; partial ester monomers of ethylenically unsaturated polycarboxylic acids, such as monobutyl fumarate, monobutyl maleate and mono-2-hydroxypropyl maleate; and mixtures thereof.

The ethylenically unsaturated acid monomer is present in an amount of 0.1 to 10% by weight, specifically 0.5 to 9% by weight, more specifically 1 to 8% by weight, based on the total weight of the monomers constituting the carboxylic acid-modified styrene copolymer. When the content of the ethylenically unsaturated acid monomer is lower than 0.1% by weight, polymerization stability is deteriorated and when the content thereof exceeds 10% by weight, the dip-molded article becomes hard and wearing sensation is deteriorated.

The carboxylic acid-modified styrene copolymer according to the present invention may further comprise an ethylenically unsaturated monomer copolymerizable with the ethylenically unsaturated nitrile monomer and the ethylenically unsaturated acid monomer. Specifically, the copolymerizable ethylenically unsaturated monomer is selected from the group consisting of: fluoroalkyl vinyl ethers, such as fluoroethyl vinyl ether; ethylenically unsaturated amide monomers, such as (meth)acrylamide, N-methylol(meth)acrylamide, N,N-dimethylol(meth)acrylamide, N-methoxymethyl(meth)acrylamide and N-propoxymethyl(meth)acrylamide; non-conjugated diene monomers, such as vinyl pyridine, vinyl norbornene, dicyclopentadiene and 1,4-hexadiene; ethylenically unsaturated carboxylic acid ester monomers, such as methyl (meth)acrylate, ethyl (meth)acrylate, butyl (meth)acrylate, 2-ethylhexyl(meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl(meth)acrylate, 1-cyanopropyl (meth)acrylate, 2-ethyl-6-cyanohexyl(meth)acrylate, 3-cyanopropyl(meth)acrylate, hydroxyethyl (meth)acrylate, hydroxypropyl (meth)acrylate, glycidyl (meth)acrylate and dimethylaminoethyl (meth)acrylate; and mixtures thereof.

The ethylenically unsaturated monomer copolymerizable with the ethylenically unsaturated nitrile monomer and the ethylenically unsaturated acid monomer is used in an amount of 5% by weight or less, based on the total weight of the monomers constituting the carboxylic acid-modified styrene copolymer. When the content exceeds 5% by weight, imbalance between soft wearing sensation and tensile strength is caused.

The carboxylic acid-modified styrene copolymer latex may be prepared by adding an emulsifier, a polymerization initiator, a molecular weight controller and the like to the monomers constituting the carboxylic acid-modified styrene copolymer, followed by emulsion polymerization.

Examples of the emulsifier include, but are not particularly limited to, anionic surfactants, nonionic surfactants, cationic surfactants and amphoteric surfactants. The surfactant is particularly preferably an anionic surfactant selected from the group consisting of alkylbenzene sulfonate, aliphatic sulfonate, sulfate ester of higher alcohol, α-olefin sulfonate and alkyl ether sulfate ester. The emulsifier is preferably used in an amount of 0.3 to 30 parts by weight, more preferably 0.8 to 25 parts by weight, and more preferably 1.5 to 20 parts by weight, based on 100 parts by weight of the monomers constituting the carboxylic acid-modified styrene copolymer.

When the emulsifier is used in an amount of less than 0.3 parts by weight, polymerization stability is deteriorated, and when the emulsifier is used in an amount exceeding 30 parts by weight, increased bubble formation makes production of dip-molded articles difficult.

The kind of the polymerization initiator is not particularly limited. The polymerization initiator is preferably a radical initiator. The radical initiator is selected from the group consisting of: inorganic peroxides, such as sodium persulfate, potassium persulfate, ammonium persulfate, potassium perphosphate and hydrogen peroxide; organic peroxides, such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide and t-butylperoxy isobutyrate; azobisisobutyronitrile; azobis-2,4-dimethylvaleronitrile; azobiscyclohexane carbonitrile; methyl azobisisobutyrate; and mixtures thereof. Inorganic peroxides are more preferred. The polymerization initiator is specifically used in an amount of 0.01 to 2 parts by weight, more specifically 0.02 to 1.5 parts by weight, based on 100 parts by weight in total of the monomers constituting the carboxylic acid-modified styrene copolymer.

When the amount of polymerization initiator used is less than 0.01 parts by weight, it is difficult to produce final products due to reduced polymerization speed, and when the amount thereof exceeds 2 parts by weight, it is impossible to control polymerization due to excessively high polymerization speed.

An activator is selected from the group consisting of sodium formaldehyde sulfoxylate, sodium ethylenediaminetetraacetate, ferrous sulfate, dextrose, sodium pyrophosphate, sodium sulfite and mixtures thereof.

Examples of the molecular weight modifier include, but are not particularly limited to: α-methylstyrene dimers; mercaptans, such as t-dodecyl mercaptan, n-dodecyl mercaptan and octyl mercaptan; halogenated hydrocarbons, such as carbon tetrachloride, methylene chloride and methylene bromide; and sulfur-containing compounds, such as tetraethylthiuram disulfide, dipentamethylenethiuram disulfide and diisopropylxanthogene disulfide. These molecular weight modifiers may be used alone or in combination of two or more thereof. Of these, mercaptans are preferred. T-dodecyl mercaptan is more preferred. The amount of the molecular weight modifier used may vary depending on the kind of the molecular weight modifier. The amount of the molecular weight modifier used is specifically 0.1 to 2.0 parts by weight, more specifically 0.2 to 1.5 parts by weight, most specifically 0.3 to 1.0 parts by weight, with respect to 100 parts by weight of the total weight of the monomers constituting the carboxylic acid-modified styrene copolymer.

When the amount of the molecular weight controller is less than 0.1 parts by weight, physical properties of a dip-molded article are significantly deteriorated and when the amount thereof exceeds 2 parts by weight, polymerization stability is disadvantageously deteriorated.

If necessary, one or more additives such as chelating agents, dispersants, pH-adjusting agents, oxygen absorbers, particle size modifiers, antioxidants, and oxygen scavengers can be added in the preparation of latex.

There is no particular restriction as to how the mixture of the monomers constituting the carboxylic acid-modified styrene copolymer is added. For example, the mixture of the monomers may be added to a polymerization reactor in one portion or in successive portions. Alternatively, after a portion of the monomer mixture is added to a polymerization reactor, the remainder is added successively to the polymerization reactor.

The emulsion polymerization is generally carried out at a temperature of 10 to 95° C., preferably 25 to 95° C. Polymerization is stopped when polymerization conversion reaches a predetermined level, preferably at least 95% and more preferably at least 98%. The carboxylic acid-modified styrene copolymer latex may be obtained by removing unreacted monomers and adjusting solid contents and pH to desired levels.

The glass transition temperature may be adjusted according to the content of the conjugated diene monomer and the average particle diameter may be adjusted according to type or content of the emulsifier.

The latex glass transition temperature is measured by differential scanning calorimetry and the average particle diameter is measured with a laser scattering analyzer (Nicomp).

3. Latex Composition for Dip Molding

A latex composition for dip molding is prepared by adding at least one additive selected from the group consisting of a vulcanizing agent, an ionic crosslinking agent, a pigment, a filler, a thickener and a pH controller to the carboxylic acid-modified nitrile copolymer latex of the present invention prepared by mixing 85 to 97% by weight of the latex A obtained by the method with 3 to 15% by weight of the latex B obtained by the method.

The latex composition for dip molding may be prepared by adding one or more additives generally used for compositions for dip molding, selected from the group consisting of an ionic crosslinking agent, a pigment such as titanium oxide, a filler such as silica, a thickener and a pH controller such as ammonium or alkali hydroxide to the carboxylic acid-modified nitrile copolymer latex.

The carboxylic acid-modified nitrile copolymer latex is preferably present in the composition, in an amount of 80 to 99% by weight, specifically 85 to 98% by weight, most specifically 88 to 97% by weight, based on the total weight of the composition in consideration of physical properties of gloves which are a type of dip-molded articles.

A solid content of the latex composition for dip molding is specifically 10 to 40% by weight, more specifically, 15 to 35% by weight, most specifically 18 to 33% by weight. The latex composition for dip molding according to the present invention specifically has a pH of 8.0 to 12, more specifically 9 to 11, most specifically 9.3 to 10.5.

4. Dip-Molded Article

The dip-molded article of the present invention may be produced by any known dip molding process. Examples of such dip molding processes include direct dipping, anode coagulation dipping and Teague's coagulation dipping processes. Anode coagulation dipping is preferred because the dip-molded article can be produced with a uniform thickness in an easy manner.

Hereinafter, a method for preparing a dip-molded article using the latex composition of the present invention will be described in detail.

(a) Immersing Hand-Shaped Mold for Dip Molding in Coagulant Solution to Adhere Coagulant to Mold Surface Examples of the coagulant include: metal halides, such as barium chloride, calcium chloride, magnesium chloride, zinc chloride and aluminum chloride; nitrates, such as barium nitrate, calcium nitrate and zinc nitrate; acetates, such as barium acetate, calcium acetate and zinc acetate; and sulfates, such as calcium sulfate, magnesium sulfate and aluminum sulfate. Of these, calcium chloride and calcium nitrate are preferred. The coagulant solution is prepared by dissolving the coagulant in water, alcohol or a mixture thereof. The concentration of the coagulant in the coagulant solution is typically 5 to 75% by weight, specifically 15 to 55% by weight.

(b) Dipping Coagulant-Adhered Mold in Latex Resin Composition to Form Dip Molding Layer Then, the mold, to which the coagulant is adhered, is dipped in the latex composition for dip molding prepared from the latex resin composition according to the present invention. The mold is taken out of the latex composition to form a dip molding layer on the mold.

(c) Heating Dip Molding Layer Formed on the Mold to Crosslink Latex Resin

During the heating, water first evaporates and the copolymer latex is then vulcanized through crosslinking. Then, the dip molding layer crosslinked by heating is peeled from the mold to obtain a dip-molded article.

(d) Measuring Physical Properties of Obtained Dip-Molded Article

A dumbbell-shape specimen was produced from the dip-molded article in accordance with ASTM D-412. Then, the specimen was drawn at an elongation rate of 500 mm/min using a universal testing machine (UTM), tensile strength and elongation at break were measured and texture was determined from stress at an elongation of 300%.

First, a hand-shaped mold for dip molding is immersed in a coagulant solution to adhere the coagulant to the surface of the mold. Examples of the coagulant include: metal halides, such as barium chloride, calcium chloride, magnesium chloride, zinc chloride and aluminum chloride; nitrates, such as barium nitrate, calcium nitrate and zinc nitrate; acetates, such as barium acetate, calcium acetate and zinc acetate; and sulfates, such as calcium sulfate, magnesium sulfate and aluminum sulfate. Of these, calcium chloride and calcium nitrate are preferred. The coagulant solution is prepared by dissolving the coagulant in water, alcohol or a mixture thereof. The concentration of the coagulant in the coagulant solution is typically 5 to 75% by weight, specifically 15 to 55% by weight, most specifically 18 to 40% by weight.

Then, the mold, to which the coagulant is adhered, is dipped in the latex composition for dip molding prepared from the carboxylic acid-modified nitrile copolymer latex according to the present invention. The mold is taken out of the latex composition to form a dip molding layer. Then, the dip molding layer formed on the mold is heated to crosslink the carboxylic acid-modified nitrile copolymer latex. During the heating, water is first evaporated and the copolymer latex is then vulcanized through crosslinking. Then, the dip molding layer crosslinked by heating is peeled from the mold to obtain a dip-molded article.

The method according to the present invention may be applied to any latex articles that can be produced by dip-molding well-known in the art. Specifically, examples of such latex articles include dip-molded latex articles selected from industrial articles, such as surgical gloves, medical examination gloves, condoms and catheters, and health care articles, such as household gloves.

Hereinafter, preferred examples will be provided for better understanding of the present invention. These examples are only provided to illustrate the present invention and it will be apparent to those skilled in the art that various modifications and alternations are possible within the scope and technical range of the present invention. Such modifications and alternations fall within the scope of claims included herein.

EXAMPLE

Example 1

After a 10 L high-pressure reactor being equipped with a stirrer, a thermometer, a cooler, and an inlet and an outlet of nitrogen gas, and allowing for continuous addition of monomers, an emulsifier and a polymerization initiator was replaced with nitrogen, 2.5 parts by weight of alkyl benzene sodium sulfonate, 0.5 parts by weight of t-dodecyl mercaptan and 140 parts by weight of ion exchange water were then added to 100 parts by weight of a monomer mixture comprising 25% by weight of acrylonitrile, 70% by weight of 1,4-butadiene and 5% by weight of methactylic acid, followed by elevating a temperature of the reactor to 40° C.

After the temperature elevation, 0.25 parts by weight of potassium persulfate as a polymerization initiator was added to the resulting mixture, and 0.1 parts by weight of sodium dimethyl dithiocarbamate was added thereto when polymerization conversion ratio reached 95% to stop polymerization. Unreacted monomers were removed by deodorization, and ammonia water, an antioxidant, a defoaming agent and the like were added to obtain a carboxylated acrylonitrile-butadiene copolymer latex having a solid content of 45% and a pH of 8.5.

As a result of analysis of latex, the latex was determined to have a glass transition temperature of −40° C. and an average particle diameter of 130 nm. Hereinafter, the latex thus prepared will be referred to as "latex-A".

Then, a 10 L high-pressure reactor being equipped with a stirrer, a thermometer, a cooler, and an inlet and an outlet of nitrogen gas and allowing for continuous addition of monomers, an emulsifier and a polymerization initiator was replaced with nitrogen, and 20 parts by weight of alkyl benzene sodium sulfonate, 0.5 parts by weight of t-dodecyl mercaptan and 300 parts by weight of ion exchange water were then added to 100 parts by weight of a monomer mixture comprising 82% by weight of styrene, 2% by weight of acrylonitrile, 10% by weight of methyl methacrylate and 6% by weight of acrylic acid, followed by elevating a temperature of the reactor to 60° C.

After the temperature elevation, 1.0 part by weight of potassium persulfate as a polymerization initiator was added and the temperature was lowered to stop polymerization when polymerization conversion ratio reached 99% to obtain a carboxylated styrene copolymer latex.

As a result of analysis of latex, the latex was determined to have a glass transition temperature of 100° C. and an average particle diameter of 42 nm. Hereinafter, the latex thus prepared will be referred to as "latex-B".

The latex-A and the latex-B were mixed at 9:1 to prepare a target latex.

(Preparation of Composition for Dip Molding)

A 3% potassium hydroxide solution and a reasonable amount of secondary distilled water were added to the latex to obtain a composition for dip molding having a solid content of 25% and a pH of 10.0.

(Production of Dip-Molded Article)

22 parts by weight of calcium nitrate, 69.5 parts by weight of distilled water, 8 parts by weight of calcium carbonate and 0.5 parts by weight of a wetting agent (Teric 320 produced by Huntsman Corporation, Australia) were mixed to prepare a coagulant solution. A hand-shaped ceramic mold was dipped in the solution for one minute, was then taken out and dried at 80° C. for 3 minutes, and a coagulant was applied to the hand-shaped mold.

Then, the coagulant-applied mold was dipped in the composition for dip molding, taken out, dried at 80° C. for one minute and was then dipped in water or warm water for 3 minutes. The mold was dried at 80° C. for 3 minutes again and cross-linked at 130° C. for 20 minutes. The cross-linked dip molding layer was peeled from the hand-shaped mold to obtain a glove-shaped dip-molded article. Physical properties of the dip-molded article are shown in Table 1.

Example 2

After a 10 L high-pressure reactor being equipped with a stirrer, a thermometer, a cooler, and an inlet and an outlet of nitrogen gas, and allowing for continuous addition of monomers, an emulsifier and a polymerization initiator was replaced with nitrogen, 3 parts by weight of alkyl benzene sodium sulfonate, 0.5 parts by weight of t-dodecyl mercaptan and 140 parts by weight of ion exchange water were added to 100 parts by weight of a monomer mixture comprising 35% by weight of acrylonitrile, 60% by weight of 1,4-butadiene and 5% by weight of methacrylic acid, followed by elevating a temperature of the reactor to 40° C.

After the temperature elevation, 0.3 parts by weight of potassium persulfate as a polymerization initiator was added to the resulting mixture, and 0.1 parts by weight of sodium dimethyl dithiocarbamate was added thereto when polymerization conversion ratio reached 95% to stop polymerization. Unreacted monomers were removed by deodorization, and ammonia water, an antioxidant, a defoaming agent and the like were added to obtain a carboxylated acrylonitrile-butadiene copolymer latex having a solid content of 45% and a pH of 8.5.

As a result of analysis of latex, the latex was determined to have a glass transition temperature of −23° C. and an average particle diameter of 130 nm. Hereinafter, the latex thus prepared will be referred to as "latex-C".

Then, a 10 L high-pressure reactor being equipped with a stirrer, a thermometer, a cooler, and an inlet and an outlet of nitrogen gas and allowing for continuous addition of monomers, an emulsifier and a polymerization initiator was replaced with nitrogen, and 6 parts by weight of alkyl benzene sodium sulfonate, 0.5 parts by weight of t-dodecyl mercaptan and 300 parts by weight of ion exchange water were added to 100 parts by weight of a monomer mixture comprising 94% by weight of styrene, 2% by weight of acrylonitrile and 4% by weight of acrylic acid, followed by elevating a temperature of the reactor to 55° C.

After the temperature elevation, 0.8 parts by weight of potassium persulfate as a polymerization initiator was added and the temperature was lowered to stop polymerization when polymerization conversion ratio reached 99% to obtain a carboxylated styrene copolymer latex.

As a result of analysis of latex, the latex was determined to have a glass transition temperature of 105° C. and an average particle diameter of 67 nm. Hereinafter, the latex thus prepared will be referred to as "latex-D".

The latex-C and the latex-D were mixed at 9:1 to prepare a target latex.

A glove-shaped dip-molded article was produced in the same manner as in Example 1 and physical properties of the article are shown in Table 1.

Example 3

A glove-shaped dip-molded article was produced in the same manner as in Example 1 except that the latex-A and the latex-B were mixed at a ratio of 97:3 in Example 3, and physical properties of the article are shown in Table 1.

Example 4

A glove-shaped dip-molded article was produced in the same manner as in Example 1 except that the latex-A and the latex-B were mixed at a ratio of 85:15 in Example 4, and physical properties of the article are shown in Table 1.

Example 5

A glove-shaped dip-molded article was produced in the same manner as in Example 1 except that the latex-A and the latex-D were mixed at a ratio of 9:1 in Example 5, and physical properties of the article are shown in Table 1.

Example 6

A glove-shaped dip-molded article was produced in the same manner as in Example 1 except that the latex-C and the latex-B were mixed at a ratio of 9:1 in Example 6, and physical properties of the article are shown in Table 1.

Comparative Example 1

A glove-shaped dip-molded article was produced in the same manner as in Example 1 except that the latex-A was used alone in Comparative Example 1 and physical properties of the article are shown in Table 1.

Comparative Example 2

A glove-shaped dip-molded article was produced in the same manner as in Example 1 except that the latex-C was used alone in Comparative Example 2 and physical properties of the article are shown in Table 1.

Example 7

A glove-shaped dip-molded article was produced in the same manner as in Example 1 except that the latex-A and the latex-B were mixed at a ratio of 8:2 in Example 7, and physical properties of the article are shown in Table 1.

Example 8

A glove-shaped dip-molded article was produced in the same manner as in Example 1 except that the latex-C and the latex-D were mixed at a ratio of 8:2 in Example 8, and physical properties of the article are shown in Table 1.

Comparative Example 3

After a 10 L high-pressure reactor being equipped with a stirrer, a thermometer, a cooler, and an inlet and an outlet of nitrogen gas, and allowing for continuous addition of monomers, an emulsifier and a polymerization initiator was replaced with nitrogen, 5 parts by weight of alkyl benzene sodium sulfonate, 0.5 parts by weight of t-dodecyl mercaptan and 140 parts by weight of ion exchange water were added to 100 parts by weight of a monomer mixture comprising 35% by weight of acrylonitrile, 60% by weight of 1,4-butadiene and 5% by weight of methacrylic acid, followed by elevating a temperature of the reactor to 40° C.

After the temperature elevation, 0.4 parts by weight of potassium persulfate as a polymerization initiator was added to the resulting mixture, and 0.1 parts by weight of sodium dimethyl dithiocarbamate was added thereto to stop polymerization when polymerization conversion ratio reached 95%. Unreacted monomers were removed by deodorization, and ammonia water, an antioxidant, a defoaming agent and the like were then added to obtain a carboxylated acrylonitrile-butadiene copolymer latex having a solid content of 45% and a pH of 8.5.

As a result of analysis of latex, the latex was determined to have a glass transition temperature of −21° C. and an average particle diameter of 80 nm. Hereinafter, the latex thus prepared will be referred to as "latex-E".

Then, a 10 L high-pressure reactor being equipped with a stirrer, a thermometer, a cooler, and an inlet and an outlet of nitrogen gas and allowing for continuous addition of monomers, an emulsifier and a polymerization initiator was replaced with nitrogen, and 2 parts by weight of alkyl benzene sodium sulfonate, 0.5 parts by weight of t-dodecyl mercaptan and 300 parts by weight of ion exchange water were added to 100 parts by weight of a monomer mixture comprising 94% by weight of styrene, 2% by weight of acrylonitrile, and 4% by weight of acrylic acid, followed by elevating a temperature of the reactor to 55° C.

After the temperature elevation, 0.3 parts by weight of potassium persulfate as a polymerization initiator was added and the temperature was lowered to stop polymerization when polymerization conversion ratio reached 99% to obtain a carboxylated styrene copolymer latex.

As a result of analysis of latex, the latex was determined to have a glass transition temperature of 105° C. and an average particle diameter of 99 nm. Hereinafter, the latex thus prepared will be referred to as "latex-F".

The latex-E and the latex-F were mixed at 9:1 to prepare a target latex.

A glove-shaped dip-molded article was produced in the same manner as in Example 1 and physical properties of the article are shown in Table 1.

Comparative Example 4

A glove-shaped dip-molded article was produced in the same manner as in Example 1 except that the latex-C and the latex-F were mixed at a ratio of 9:1 in Comparative Example 4, and physical properties of the article are shown in Table 1.

Comparative Example 5

A glove-shaped dip-molded article was produced in the same manner as in Example 1 except that the latex-E and the latex-D were mixed at a ratio of 9:1 in Comparative Example 5, and physical properties of the article are shown in Table 1.

TABLE 1

| | Tensile strength (MPa) | Elongation (%) | Stress at 300% (MPa) |
|---|---|---|---|
| Example 1 | 34.8 | 622 | 4.8 |
| Example 2 | 32.9 | 630 | 4.7 |
| Example 3 | 30.2 | 652 | 4.0 |
| Example 4 | 34.5 | 600 | 5.0 |
| Example 5 | 33.5 | 614 | 4.8 |
| Example 6 | 35.0 | 624 | 4.6 |
| Comparative Example 1 | 23.8 | 682 | 3.1 |
| Comparative Example 2 | 27.9 | 659 | 3.7 |
| Example 7 | 28.9 | 564 | 6.5 |
| Example 8 | 27.0 | 528 | 6.2 |
| Comparative Example 3 | 25.0 | 538 | 5.6 |
| Comparative Example 4 | 26.5 | 570 | 4.2 |
| Comparative Example 5 | 24.0 | 538 | 5.8 |

As can be seen from results of Table 1, the dip-molded article produced from the carboxylic acid-modified nitrile latex mixed with the carboxylic acid-modified styrene latex having a low glass transition temperature and a large average particle diameter exhibited superior physical properties such as tensile strength, elongation and stress.

INDUSTRIAL APPLICABILITY

As apparent from the fore-going, the present invention enables production of molded articles with superior tensile strength using a latex prepared by mixing 85 to 97% by weight of a carboxylic acid-modified nitrile copolymer latex having a glass transition temperature of −50° C. to −15° C. and an average particle diameter of 90 nm or higher with 3 to 15% by weight of a carboxylic acid-modified styrene copolymer latex having a glass transition temperature of 80° C. or higher and an average particle diameter less than 90 nm.

What is claimed is:

1. A carboxylic acid-modified nitrile copolymer latex for dip molding comprising:
   a carboxylic acid-modified nitrile copolymer latex having a glass transition temperature of −50° C. to −15° C. and an average particle diameter not less than 90 nm and not more than 200 nm; and
   a carboxylic acid-modified styrene copolymer latex having a glass transition temperature of 80° C. or higher and an average particle diameter not less than 15 nm and less than 90 nm,
   wherein the carboxylic acid-modified nitrile copolymer latex and the carboxylic acid-modified styrene copolymer latex are present at a weight ratio of 97:3 to 85:15, and
   wherein the carboxylic acid-modified styrene copolymer latex is polymerized from a monomer mixture comprising 80 to 99% by weight of an aromatic vinyl monomer, 1 to 20% by weight of an ethylenically unsaturated nitrile monomer, and 0.1 to 10% by weight of an ethylenically unsaturated acid monomer.

2. The carboxylic acid-modified nitrile copolymer latex for dip molding according to claim 1, wherein the carboxylic acid-modified nitrile copolymer latex is polymerized from a monomer mixture comprising 40 to 89% by weight of a conjugated diene monomer, 10 to 50% by weight of an ethylenically unsaturated nitrile monomer and 0.1 to 10% by weight of an ethylenically unsaturated acid monomer.

3. The carboxylic acid-modified nitrile copolymer latex for dip molding according to claim 2, wherein the conjugated diene monomer comprises at least one selected from the group consisting of 1,3-butadiene, 2,3-dimethyl-1,3-butadiene, 2-ethyl-1,3-butadiene, 1,3-pentadiene and isoprene.

4. The carboxylic acid-modified nitrile copolymer latex for dip molding according to claim 2, wherein the ethylenically unsaturated nitrile monomer comprises at least one selected from the group consisting of acrylonitrile, methacrylonitrile, fumaronitrile, α-chloronitrile and α-cyanoethylacrylonitrile.

5. The carboxylic acid-modified nitrile copolymer latex for dip molding according to claim 2, wherein the ethylenically unsaturated acid monomer comprises at least one selected from the group consisting of acrylic acid, methacrylic acid, itaconic acid, maleic acid, fumaric acid, maleic anhydride, citraconic anhydride, styrenesulfonic acid, monobutyl fumarate, monobutyl maleate and mono-2-hydroxypropyl maleate.

6. The carboxylic acid-modified nitrile copolymer latex for dip molding according to claim 1, wherein the aromatic vinyl monomer comprises at least one selected from the group consisting of styrene and α-methyl styrene.

7. The carboxylic acid-modified nitrile copolymer latex for dip molding according to claim 1, wherein the ethylenically unsaturated nitrile monomer comprises at least one selected from the group consisting of acrylonitrile, methacrylonitrile, fumaronitrile, α-chloronitrile and α-cyanoethylacrylonitrile.

8. The carboxylic acid-modified nitrile copolymer latex for dip molding according to claim 1, wherein the ethylenically unsaturated acid monomer comprises at least one selected from the group consisting of acrylic acid, methacrylic acid, itaconic acid, maleic acid, fumaric acid, maleic anhydride, citraconic anhydride, styrenesulfonic acid, monobutyl fumarate, monobutyl maleate and mono-2-hydroxypropyl maleate.

9. The carboxylic acid-modified nitrile copolymer latex for dip molding according to claim 1, wherein the carboxylic acid-modified nitrile copolymer latex further comprises an ethylenically unsaturated monomer copolymerizable with the monomers constituting the copolymer in an amount of 5% by weight or less, based on the total weight of the copolymer.

10. The carboxylic acid-modified nitrile copolymer latex for dip molding according to claim 9, wherein the copolymerizable ethylenically unsaturated monomer comprises at least one selected from the group consisting of vinyl aromatic monomers, fluoroalkyl vinyl ethers, ethylenically unsaturated amide monomers, non-conjugated diene monomers and ethylenically unsaturated carboxylic acid ester monomers.

11. The carboxylic acid-modified nitrile copolymer latex for dip molding according to claim 1, further comprising 0.3 to 30 parts by weight of an emulsifier, 0.01 to 2 parts by weight of a polymerization initiator, and 0.1 to 2.0 parts by weight of a molecular weight controller, with respect to 100 parts by weight in total constituting the carboxylic acid-modified nitrile copolymer.

12. A latex composition for dip molding comprising the carboxylic acid-modified nitrile copolymer latex for dip molding according to claim 1.

13. The latex composition for dip molding according to claim 12, wherein the carboxylic acid-modified nitrile copolymer latex for dip molding is present in an amount of 80 to 99% by weight in the composition.

14. The latex composition for dip molding according to claim 12, wherein the latex composition comprises at least one additive selected from the group consisting of pigments, vulcanizing agents, fillers, thickeners and pH controllers.

15. A dip-molded article obtained by dip molding the latex composition for dip molding according to claim 12.

16. The dip-molded article according to claim 15, wherein the dip-molded article is a medical examination glove, a condom, a catheter, an industrial glove, a household glove or a health care product.

* * * * *